United States Patent [19]

Kawai

[11] Patent Number: 4,742,530
[45] Date of Patent: May 3, 1988

[54] RADIO RELAY METHOD AND ITS APPARATUS FOR DIGITAL COMMUNICATION

[75] Inventor: Masahisa Kawai, Zama, Japan
[73] Assignee: Fujitsu Limited, Japan
[21] Appl. No.: 898,873
[22] Filed: Aug. 20, 1986

Related U.S. Application Data

[63] Continuation of Ser. No. 669,837, Nov. 9, 1984, abandoned.

[30] Foreign Application Priority Data

Nov. 11, 1983 [JP] Japan ................................ 58-212011

[51] Int. Cl.$^4$ ........................ H04L 25/52; H04B 3/46
[52] U.S. Cl. ......................................... 375/4; 455/8; 370/98; 379/343
[58] Field of Search ....................... 375/3, 4, 109, 104; 455/8, 9, 13, 14, 15; 370/16, 74, 75, 98, 94, 92; 340/825.02, 825.03, 825.52; 379/342, 343

[56] References Cited

U.S. PATENT DOCUMENTS

| | | | |
|---|---|---|---|
| 4,197,496 | 4/1980 | Hiyama | 370/98 |
| 4,347,501 | 8/1982 | Akerberg | 455/9 |
| 4,427,968 | 1/1984 | York | 455/15 |
| 4,531,238 | 7/1985 | Rawson et al. | 375/3 |

FOREIGN PATENT DOCUMENTS 0085940  8/1983  European Pat. Off. .

OTHER PUBLICATIONS

EP 84 11 3521 European Search Report, Searched at The Hague by Examiner Veaux, C. J., completed Mar. 23, 1987.

Primary Examiner—Robert L. Griffin
Assistant Examiner—Marianne Huseman
Attorney, Agent, or Firm—Staas & Halsey

[57] ABSTRACT

A radio relay method for digital communication using a heterodyne relay system consisting of terminal stations and relay stations each having radio repeaters using radio frequency of microwave or millimeter wave. The radio repeater usually receives a desired signal as a correct signal for a route to which the terminal and relay stations belong, however, the radio repeater can receive an undesired signal, whose level is beyond the threshold level of a squelch circuit in the radio repeater, produced by interference with an radio signal from an adjacent different route for example. When the desired signal decays due to fading for example and the undesired wave becomes dominant, the terminal station of the route must distinguish which relay station has a trouble. The radio repeater of the present invention detects a received route signal from the received undesired signal; determines whether the received route signal is incorrect for the route, stops a received main signal in the received undesired signal, and sends only a supervisory signal to successive relay stations with a correct route signal generated by the radio repeater, so that the terminal station can detect the route signal and recognize the state of the relay station from the supervisory signal.

9 Claims, 3 Drawing Sheets

RADIO RELAY METHOD AND ITS APPARATUS FOR DIGITAL COMMUNICATION

This is a continuation of co-pending application Ser. No. 669,837, filed on Nov. 9, 1984, now abandoned.

BACKGROUND OF THE INVENTION

The present invention relates to a radio relay method and apparatus for digital communication which applies to a heterodyne radio relay system using micro-wave or millimeter-wave radio signals.

The radio relay system is to relay a main signal and an auxiliary signal from one terminal station to another through relay stations. Two radio transmitters and two radio receivers are provided at each terminal station and two radio repeaters are provided at each relay station for back-and-forth communication. The transmitted and received radio signal includes a main signal which transmits digital information such as aural, visual, and data information, and an auxiliary signal which supervises and/or controls remotely the relay stations to maintain them in good condition at or from the terminal station. The terminal station is usually an attended station and the relay station is usually an unattended station. The auxiliary signal comprises an order-wire channel signal, a supervisory signal, and a control signal which includes a pilot signal. The order-wire channel signal is for communication between the attending persons at the terminal station and the relay station for the maintenance of the radio relay system, the supervisory signal is to supervise remotely the state of the radio repeaters from the terminal stations, the control signal is to control remotely the radio repeaters from the terminal stations, and the pilot signal is to distinguish the routes of each radio relay system. Above all, the pilot signal is very important with respect to the present invention and will be discussed in detail later. The main signal is transmitted by a radio carrier modulated by phase shift keying (PSK) modulation and the auxiliary signal is usually transmitted by modulating slightly the carrier using frequency modulation (FM).

Figure 1:
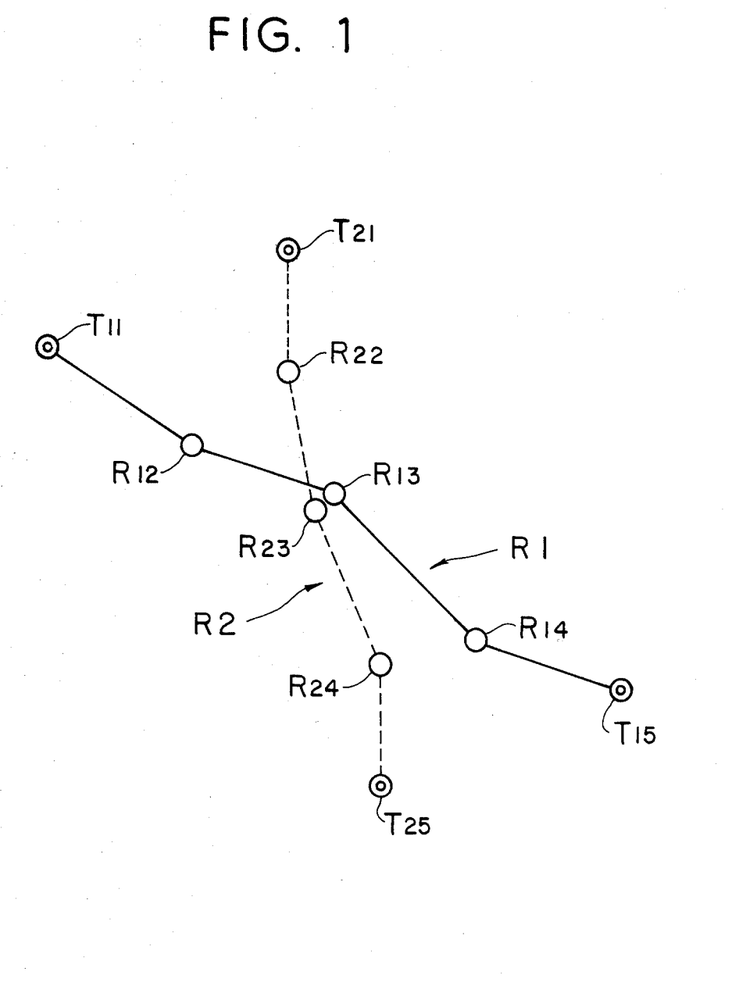
FIG. 1 is a drawing illustrating routes of digital communication systems.

The pilot signals are used to distinguish individually the routes of the radio relay system. FIG. 1 shows an example of two routes R1 and R2 where the route R1 consists of terminal stations $T_{11}$ and $T_{15}$ and relay stations $R_{12}$, $R_{13}$, and $R_{14}$, and the route R2 consists of terminal stations $T_{21}$ and $T_{25}$ and relay stations $R_{22}$, $R_{23}$, and $R_{24}$. Let us assume that the routes R1 and R2 intersect each other at the relay stations $R_{13}$ and $R_{23}$. A pilot signal is provided by synthesizing different low frequencies, so each route has its own pilot signal at a synthesized frequency where $P_1$ is a pilot signal for the route R1, and $P_2$ is for the route R2.

For the terminal and relay stations, the pilot signal is necessary to distinguish on which radio wavepath a received signal comes in, that is, whether the received signal is a desired signal or an undesired signal. The desired signal is a correct radio signal which should be received by the terminal or relay station, and the undesired signal, even though its radio frequency is the same as that of the desired signal, is an incorrect radio signal such as a radio signal which arrives at a receiving antenna of the terminal or relay station in the form of an interference wave produced by radio waves from the regular route and an adjacent irregular route. Usually, it is impossible to avoid having the undesired signal at the terminal or relay station because of antenna characteristics such as the side lobes of an antenna. This is especially true in digital communication, in which the radio relay system tends to easily pick-up undesired signals due to the wide frequency band-width required in digital communication. However, if the level of the desired signal is dominant as compared to the undesired signal level, the radio relay system is not affected by the existence of a a low level undesired signal, because, the quality of the digital communication does not depend on the signal to noise (S/N) ratio as in an analog communication. However, if the desired signal decays because of fading for example, and the undesired signal happens to become dominant the pilot signal is useful.

In FIG. 1, when the main signals are respectively transmitted from the up-line terminal station $T_{11}$ to the down-line terminal station $T_{15}$ in the route R1 and from $T_{21}$ to $T_{25}$ in the route R2, and when the radio transmission between the relay stations $R_{12}$ and $R_{13}$ in the route R1 is attenuated by heavy rain, an interference wave which has been produced between the radio waves of the routes R1 and R2 becomes dominant at the relay station $R_{13}$, which causes the main signal in the route R2 to cut into the route R1 at the relay station $R_{13}$. This results in false reception of a main signal at the terminal station $T_{15}$. The radio receiver at the terminal station $T_{15}$ rejects the false signal by detecting the proper pilot signal $P_2$.

As digital communication becomes more popular, the radio spectrum for communication becomes more congested, especially in the city. Therefore, the undesired signal is becoming a very important subject which must be considered in designing the radio repeater. More details as to the received signal for the undesired signal will be explained later with respect to a block diagram of the prior art radio repeater.

Figure 2:
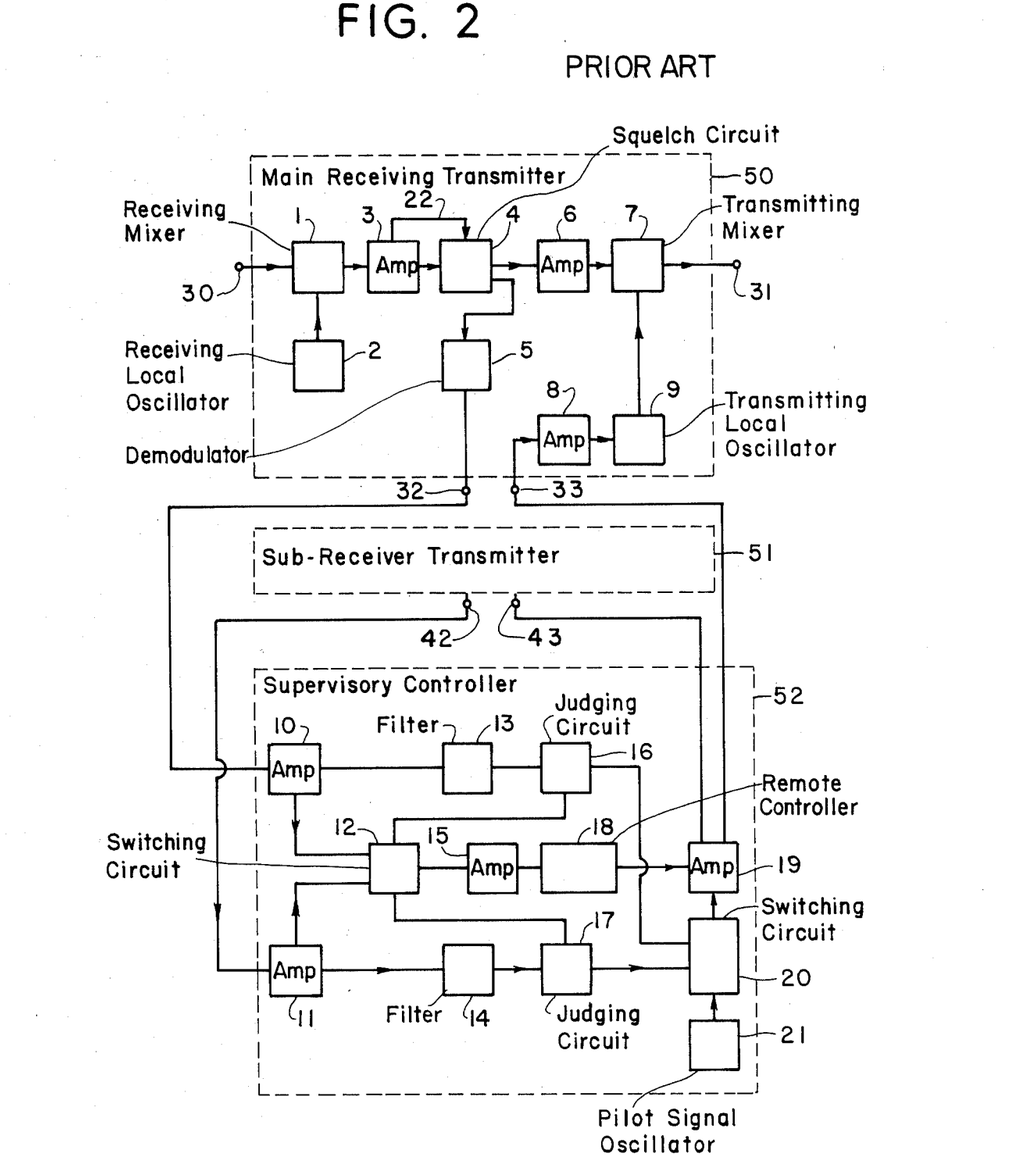
FIG. 2 is a block diagram for a prior art radio repeater.

FIG. 2 is a block diagram of a prior art radio repeater which consists of main and sub receiver-transmitters 50 and 51 and a supervisory-controller 52 except receiving and a transmitting antennas and their attached circuits. Both main 50 and sub 51 receiver-transmitters are hot and the one which produces an output having the best S/N ratio is automatically selected. The function of the radio repeater will be explained with respect to the main receiver-transmitter hereinafter. An input signal which arrives at an input terminal 30 from an antenna and an output from a receiving local oscillator 2 are mixed in a receiving mixer 1 and converted to an intermediate frequency (IF) signal. The IF signal is amplified by an IF amplifier 3 and fed to a squelch circuit 4. The squelch circuit 4 operates as a switching circuit so that the IF signal is transferred to a next stage when the level of the IF signal exceeds a threshold level designated in the squelch circuit 4. This switching operation can be performed as follows: and IF signal mean level provided by the IF amplifier 3 is fed to the squelch circuit through a connecting line 22; the mean level is compared with the threshold level; and the IF signal is transferred to the next stage through the squelch circuit when the mean level exceeds the threshold level and vice versa. A branch circuit is included in the squelch circuit 4 so that the IF signal which has gone through the squelch circuit 4 is separated into two signals each at half the original level, and one of the two goes to an IF amplifier 6 of the transmitter-receiver 50 and the other goes to the supervisory-controller 52. The former IF signal is amplified by an IF amplifier 6, and mixed with an output of a transmitting local oscillator 9 by a transmitting mixer 7 to convert it to a radio frequency (RF)

signal. The RF signal leaves the ouput terminal 31, and is transmitted to a successive relay station through a transmitting antenna. The transmitting local oscillator 9 is modulated using frequency modulation based on an auxiliary signal which will be explained later, so that the receiver-transmitter 50 can relay the main signal along with the auxiliary signal. The later IF signal is demodulated by a demodulator 5 in which a received auxiliary signal is removed and sent to the supervisory-controller 52 through an output terminal 32 of the receiver-transmitter 50.

The received auxiliary signal which comes from the receiver-transmitter 50 is amplified by a low frequency amplifier 10 in the supervisory-controller 52, and a part of the amplified signal is fed to a filter 13 through which a pilot signal included in the received auxiliary signal is filtered out and fed to judging circuit 16. The judging circuit 16 determines whether the pilot signal is correct for the route in which its own radio repeater belongs and produces a judged signal and sends it to switching circuits 12 and 20. When the judged signal is correct, the switching circuit 12 becomes on and the switching circuit 20 becomes off. When the switching circuit 12 is on, the received auxiliary signal is fed to a remote controller 18 through a low frequency amplifier 15, and the remote controller 18 removes supervisory signals required by the relay station and inserts other supervisory signals. The inserted supervisory signals are amplified by a low frequency amplifier 19 and sent to an input terminal 33 of the main receiver-transmitter 50. The inserted supervisory signal is amplified again by a low frequency amplifier 8, and fed to the transmitting local oscillator 9. The transmitting RF carrier is modulated by the inserted supervisory signals in the form of frequency modulation. Thus, the relayed main signal and the auxiliary signal including the inserted supervisory signals can be relayed to a successive relay station with the pilot signal included in the IF signal. The same process as discussed above occurs in the sub-receiver-transmitter 51. The received auxiliary signal which comes from the output terminal 42 of the sub-receiver-transmitter 51 is fed to low frequency amplifier 11 of the supervisory-controller 52; this signal is also dealt with using the same process as mentioned above, and the switching circuit 12 compares both signals amplifiers by the low frequency amplifier 10 and 11 and selects the signal having better S/N ratio. The inserted or selected supervisory signal is also applied to an input terminal 43 of the sub-receiver-transmitter 51 to modulate the RF carrier. The RF signals from the receiver-transmitters 50 and 51 are compared and an RF signal having the highest level is transmitted to the successive relay stations.

When the desired signal decays and there is no undesired signal which is received by the radio repeater, the squelch circuit 4 in the receiver-transmitter 50 turns off, so that there is no output of the received auxiliary signal at the output terminal 32. Then, the judging circuits 16 and 17 in the supervisory-controller 52 turn the switching circuit 12 off so that the connection between the low frequency amplifiers 10 and 15 is off. As a result the inserted supervisory signal is fed to the low frequency amplifier 19, and the switching circuit 20 is turned on, and a generated normal pilot signal from a pilot signal oscillator 21 is also fed to the low frequency amplifier 19. The inserted supervisory signal and the generated correct or normal pilot signal are fed to the transmitting local oscillator 9 and modulate the transmitting RF carrier. The inserted supervisory signal includes information indicating that the relay station in question has not received the desired signal, and the terminal station can recognize that there is trouble at a point in the path before this relay station.

The explanation above is with respect to the receiving state at the radio repeater when the desired signal is dominant over the undesired signal or when the desired signal is decayed and the radio repeater does not receive any radio wave. However, the following state or situation sometimes occurs. The radio repeater receives both signals, a desired signal and an undesired signal, the level of the undesired signal is lower than that of the desired signal but higher than the threshold level of the squelch circuit. In this state, when the desired signal level is sufficiently high in comparison with that of the undesired signal, the operation of the radio repeater is normal. However, once the level of the desired signal decays due to fading for example, the level of the undesired signal becomes dominant, so that a main signal and an auxiliary signal from the undesired signal become dominant. As a result, a received pilot signal is incorrect, so the judging circuit 16 turns the switching circuit 12 off and the switching circuit 20 on. Then, the inserted supervisory signal is sent to the transmitting local oscillator 9 with the generated correct pilot signal. On the other hand, the IF signal which includes an incorrect pilot signal goes through the squelch circuit 4 and is fed to the transmitting mixer 7 through the IF amplifier 6. Consequently, the received incorrect pilot signal and the generated correct pilot signal are mixed in the transmitting mixer 7 and sent to a successive relay station.

When such a mixed pilot signal arrives at the terminal station, since each pilot signal consists of different low frequency signals, the terminal station is thrown into confusion as to the pilot signal. This causes the terminal station to reject the whole received signal. This means that the terminal station can not receive the supervisory signal from the relay station, in other words, there is no way to find out which station is experiencing fading and which relay station is in trouble. This has been a problem of the prior art radio relay method and apparatus for the digital communication.

SUMMARY OF THE INVENTION

An object of the present invention is to provide an improved radio relay method for digital communication and provide an apparatus for performing the method.

Another object of the present invention is to provide a radio relay method and apparatus that stops a signal received by a radio repeater at a relay station of the radio relay system from being relayed to a successive relay station of the radio relay system when the signal belongs to an undesired signal and the undesired signal is dominant in comparison with a desired signal, where the desired signal is a radio frequency wave which is correct for the radio repeater, and the undesired signal is an incurred radio frequency signal which happens to be received by the radio repeater as an interference wave for example.

An additional object of the present invention is to provide a radio relay method and apparatus that generates a correct pilot signal in the radio repeater, where the pilot signal is a signal for distinguishing a route of an individual ratio relay system, and where a correct pilot signal is a pilot signal which is correct for a route including the radio repeater.

A further object of the present invention is to provide a radio relay method and apparatus that provides a supervisory signal from each relay station in the radio repeater.

A still further object of the present invention is to provide a radio relay method and apparatus that sends the provided supervisory signal to the successive relay station with the generated correct pilot signal.

The improvement in the prior art method and apparatus can be provided a radio repeater using a heterodyne system, where the radio repeater comprises a receiver-transmitter and a supervisory-controller. The apparatus separates a received signal into two signals at an input of a squelch circuit in the receiver-transmitter feeds one or a first separated signal to the squelch circuit and the other one or a second to the supervisory-controlled. An auxiliary signal is removed from the second separated signal in the receiver-transmitter and a received pilot signal is removed in the supervisory-controller. The received pilot signal is judged as to whether it is correct for the route in the supervisory-controller. The first separated signal is stopped from passing through the squelch circuit when the received pilot signal is judged incorrect. The received auxiliary signal is also stopped from being relayed to a successive relay station in the radio relay system when the received pilot signal is judged incorrect. A supervisory signal of own relay station is provided by the supervisory-controller when the received pilot signal is judged incorrect and the supervisory signal is sent to the successive relay station with the correct pilot signal as generated in the supervisory-controller when the received pilot signal is judged incorrect.

Applying the present invention to the radio relay system, a terminal station in the route in which the relay station and the terminal station belong can detect the correct pilot signal and can recognize the state of the relay station from the supervisory signal inserted by the radio repeater.

DESCRIPTION OF THE PREFERRED EMBODIMENT

Figure 3:
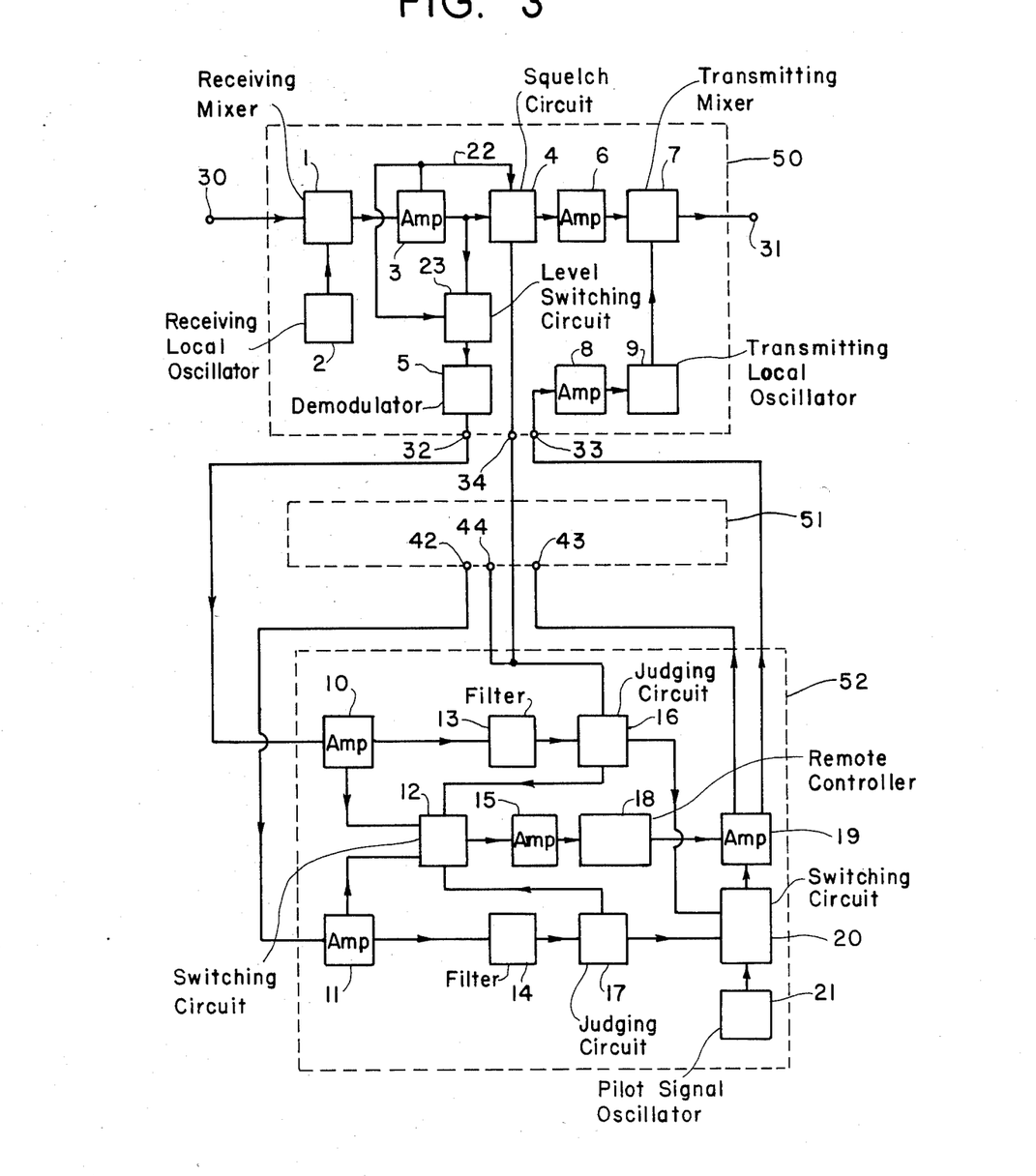
FIG. 3 is a block diagram for an embodiment of a radio repeater to which the present invention is applied.

FIG. 3 is a block diagram of the embodiment of a radio repeater to which the present invention is applied. In the figure, the same reference numerals as in FIG. 1 designate the same elements or parts. The radio repeater consists of a main receiver-transmitter 50, a sub-receiver-transmitter 51, and a supervisory-controller 52. Respective functions of the units are the same as those in FIG. 1, however some parts of respective units are changed as follows: (1) in the main receiver-transmitter 50, the IF signal is separated into two parts at an input point of the squelch circuit 4, one of which is fed to the demodulator 5, and the other IF signal is fed to the squelch circuit 4; (2) the IF signal to be demodulated by the demodulator 5 is first fed to a level switching circuit 23 which is a switching circuit or squelch circuit which stops the IF signal from passing to the demodulator 5 when the mean level of the IF signal decreases to a noise level, this it to avoid the judging circuit 16 being thrown into confusion during its judging operation by noise which resulting when there are no main and auxiliary signals in the IF signal, the same change is applied to the sub-receiver-transmitter 51; and (3) the judging circuit 16 also produces a control signal sent to the squelch circuit 4 through an input terminal 34 of the receiver-transmitter 50, so that the judging circuit 16 controls the squelch circuit 4 to make the received IF signal go through the squelch circuit 4 when the judging circuit 16 judges that the received pilot signal is correct, and the judging circuit 16 controls the squelch circuit 4 to stop the received IF signal from passing therethrough when the the received pilot signal is judged incorrect by the judging circuit 16, the same function is also provided by sub-receiver-transmitter 51.

When the level of the desired signal is dominant over that of the undesired signal the switching circuit 23 makes the IF signal go therethrough, the received auxiliary signal is demodulated from the IF signal by the demodulator 5, and the judging circuit 16 judges that the received pilot signal is correct, the judging circuit 16 controls the squelch circuit 4 to make the received IF signal go to the transmitting mixer 7 through the IF amplifier 6 so that the IF signal is converted to a radio wave and transmitted. In addition, the judging circuit 16 controls the auxiliary signal switching circuit 12 to make the received auxiliary signal go to the next stage, and controls the pilot signal switching circuit 20 to stop the pilot signal generated by the pilot signal oscillator 21 from going therethrough, so that a part of the received auxiliary signal and the provided supervisory signal are mixed at the remote controller 18 and are fed to the local oscillator 9 to modulate the radio frequency using frequency modulation. Consequently, the received main signal and part of the received auxiliary signal and the supervisory signal provided in the radio repeater can be transmitted to a successive relay station when the desired wave is dominant.

When the undesired signal becomes dominant because the desired signal decays due to fading for example, the level switching circuit 23 makes the IF signal go therethrough, the received auxiliary signal is demodulated from the IF signal by the demodulator 5, the judging circuit 16 judges that the received pilot signal is incorrect and controls the squelch circuit 4 to stop the received IF signal from going to the next stage, control the auxiliary signal switching circuit 12 to stop the received auxiliary signal from going to the next stage, and also controls the pilot signal switching circuit 20 to make the correct pilot signal generated by the pilot signal oscillator 21 go to the transmitting local oscillator 9. Therefore, the transmitting mixer 7 transmits no main signals, only transmits the supervisory signal provided by the remote controller 18 and the generated correct pilot signal using frequency modulation, to a successive relay station.

When the radio repeater receives no RF signal, which means there are no desired or undesired signals, the level switching circuit 23 stops the noise from going to the supervisory-controller 52, the judging circuit 16 controls the switching circuits 12 and 20 so that they operate the same as in a case of an undesired signal, and the squelch circuit 4 stops the noise going through it. Consequently, the relay station transmits only the supervisory signal provided by the radio repeater to the successive relay station along with the correct pilot signal generated by the radio repeater.

Thus, even though a radio repeater at a relay station of a route receives an undesired signal, the terminal station of the route distinguishes the correct pilot signal and recognizes the information from the relay station receiving the undesired signal.

What is claimed is:

1. An apparatus for radio relay for digital communication, for determining whether a received signal received at a relay station comes from a correct route to which said relay station belongs or from an incorrect route, said apparatus comprising:

means for converting an input radio frequency signal into a received intermediate frequency signal (IF), said received IF signal including said received signal and said received signal comprising a main signal and a received auxiliary signal including a received route signal for discriminating said route;

a radio squelch and switching circuit having an input operatively connected to said means for converting;

means for separating said received IF signal into first and second IF signals at the input of said radio squelch and switching circuit;

means for demodulating the received auxiliary signal in the first IF signal;

means for stopping the first IF signal from going to said means for demodulating, when a mean level of said received IF signal decreases to a noise level;

means for detecting the received route signal in said demodulated received auxiliary signal;

means for determining whether said received route signal is correct for said route;

a remote controller for removing and inserting supervisory signals;

an auxiliary signal switching circuit operatively connected to said remote controller and said means for demodulating;

means for making said received auxiliary signal go to said remote controller by turning on said auxiliary signal switching circuit using said means for determining, when said means for determining determines said received route signal is correct;

means for providing a substitute auxiliary signal from said relay station by removing information from said received auxiliary signal and adding a supervisory signal at said remote controller, when said means for determining determines said received route signal is correct;

a transmitting local oscillator;

means for feeding said substitute auxiliary signal to said transmitting local oscillator, when said means for determining determines said received route signal is correct;

a route signal oscillator for generating a substitute route signal;

a route signal switching circuit operatively connected to said route signal oscillator and said transmitting local oscillator;

means for stopping the substitute route signal generated by said route signal oscillator from going to said transmitting local oscillator by turning off said route signal switching circuit using said means for determining when said means for determining determines said received route signal is correct;

a transmitting mixer operatively connected to said radio squelch and switching circuit;

means for making the second IF signal go to said transmitting mixer by controlling said radio squelch and switching circuit using said means for determining, when said means for determining determines said received route signal is correct; and means for sending said received IF signal with said received route signal and said substitute auxiliary signal to a successive relay station using said transmitting mixer as modulated by said transmitting local oscillator, when said judging circuit judges said received route signal is correct.

2. An apparatus for radio relay for digital communication, for determining whether a received signal received at a relay station comes from a correct route to which said relay station belongs or from an incorrect route, said apparatus comprising:

means for converting an input radio frequency signal into a received intermediate frequency (IF) signal, said received IF signal including said received signal and said received signal comprising a main signal and a received auxiliary signal including a received route signal for discriminating said route;

a radio squelch and switching circuit having an input connected to said means for converting;

means for separating said received IF signal into first and second IF signals at the input of said radio squelch and switching circuit;

means for demodulating the received auxiliary signal in the first IF signal;

means for stopping said first IF signal from going to said means for demodulating, when a mean level of said received IF signal decreases to a noise level;

means for detecting the received route signal in said demodulated auxiliary signal;

means for determining whether said received route signal is correct for said route;

a transmitting local oscillator operatively connected to said radio squelch and switching circuit;

an auxiliary signal switching circuit operatively connected to said means for separating;

a remote controller, operatively connected to said auxiliary signal switching circuit and said transmitting local oscillator, for removing said inserting supervisory signals;

means for stopping said received auxiliary signal from going to said transmitting local oscillatory by turning said auxiliary signal switching circuit off using said means for determining and providing only the supervisory signal from said remote controller as a substitute auxiliary signal, and feeding said substitute auxiliary signal to said transmitting local oscillator, when said means for determining determines said received route signal is incorrect;

a route signal generator for generating a substitute route signal;

a route signal switching circuit operatively connected to said route signal generator and said transmitting local oscillator;

means for providing the substitute pilot signal generated by said route signal oscillator to said transmitting local oscillator by turning said route signal switching circuit on using said means for determining, when said means for determining determines said received route signal is incorrect;

a transmitting local oscillator operatively connected to said route signal switching circuit;

a transmitting mixer operatively connected to said radio squelch and switching circuit and said transmitting local oscillator;

means for stopping the second IF signal from going to said transmitting mixer by turning said radio squelch and switching circuit off using said means for determining, when said means for determining determines said received route signal is incorrect; and means for sending said substitute auxiliary signal with said generated substitute route signal to a successive relay station with said transmitting mixer modulated using said transmitting local oscillator, when said means for determining determines said received route signal is incorrect.

3. A radio repeater receiving a radio signal including an information signal and an auxiliary signal, the auxiliary signal including supervisory signals and a pilot signal, said repeater comprising:

receiving means for receiving the radio signal;

signal level means, operatively connected to said receiving means, for producing a mean signal level of the radio signal;

level switching means, operatively connected to said level means and to receive the radio signal, for transmitting the radio signal therethrough when the mean signal level is higher than a predetermined threshold;

demodulation means, operatively connected to said level switching means, for removing the auxiliary signal from the radio signal;

filter means, operatively connected to said demodulator means, for removing the pilot signal from the auxiliary signal;

pilot signal determinination means, operatively connected to said filter means, for producing a control signal indicating that the pilot signal is incorrect or absent;

squelch means, operatively connected to said signal level means, said pilot signal determination means and to receive the radio signal, for transmitting the radio signal therethrough when the control signal is absent;

auxiliary signal switching means, operatively connected to said demodulator means, for transmitting the auxiliary signal therethrough when the control signal is absent;

supervisory signal means, operatively connected to said auxiliary signal switching means, for removing and inserting supervisory signals into the auxiliary signal when the auxiliary signal is received and for generating new supervisory signals when the auxiliary signal is not received;

substitute pilot signal generating means for producing a substitute pilot signal;

pilot switching means, operatively connected to said substitute pilot signal generating means and said pilot signal determination means, for transmitting the substitute pilot signal therethrough when the control signal is absent;

combining means, operatively connected to said supervisory signal means and said pilot switching means, for transmitting the auxiliary signal therethrough or combining the new supervisory signals and substitute pilot signal into a substitute auxiliary signal;

mixing means, operatively connected to said combining means and said squelch means, for transmitting the radio signal therethrough and for combining the auxiliary signal with the radio signal or for producing a new radio signal from said substitute auxiliary signal; and transmitting means, operatively connected to said mixing means, for transmitting the radio signal or the new radio signal.

4. A method of digital communication radio delay, for determining whether a transmitting signal, which is received by a relay station being one of plural relay stations located along one of plural radio relay routes provided in a radio relay system, is coming from a correct route, the transmitting signal comprising a main signal and an auxiliary signal, the main signal comprising a signal for transmitting data, and the auxiliary signal comprising a route signal for discriminting individual radio relay routes through which a desired transmitting signal is transmitted, the correct route being a route through which the desired transmitting signal is transmitted and arrives at the relay station, and the incorrect route being a route through which an undesired signal is transmitted and arrives at the relay station, said method comprising the steps of:

(a) receiving the transmitting signal at the relay station from one of the radio relay routes in the radio relay system;

(b) extracting the auxiliary signal from the received transmitting signal;

(c) detecting the route signal in the extracted auxiliary signal;

(d) determining, using a judging circuit in the relay station, from the detected route signal, whether the received transmitting signal comes from the correct route;

(e) producing a substitute auxiliary signal at the relay station, the substitute auxiliary signal comprising a substitute route signal which is equal to the correct route signal;

(f) interrupting the received transmitting signal going to successive relay stations on the one of the radio relay routes from the relay station when the received transmitting signal is determined to come from the incorrect route; and (g) sending the substitute auxiliary signal to the successive relay stations from the relay station using the substitute route signal when the received transmitting signal is determined to come from the incorrect route.

5. A method according to claim 4, wherein the substitute auxiliary signal further comprises a substitute supervisory signal for successive relay stations on the one of the radio relay routes from the relay stations when the received transmitting signal is determined to come from the incorrect route, the substitute supervisory signal providng information that the received transmitting signal comes from the incorrect route to said successive relay stations.

6. A method according to claim 4, wherein the extraction of the auxiliary signal from the received transmitting signal is performed using a radio squelch and switching circuit provided in the relay station.

7. A method according to claim 4, wherein the detection of the auxiliary signal in the received transmitting signal is performed using a filter provided in the relay station.

8. A method according to claim 4, wherein the interruption of the received transmitting signal is performed further using the judging circuit.

9. A method according to claim 4, wherein the interruption of the received transmitting signal is performed using a judging circuit provided in the relay station.

* * * * *

UNITED STATES PATENT AND TRADEMARK OFFICE
CERTIFICATE OF CORRECTION

PATENT NO. : 4,742,530
DATED : May 3, 1988
INVENTOR(S) : KAWAI

It is certified that error appears in the above-identified patent and that said Letters Patent is hereby corrected as shown below:

FRONT PAGE
 [73] Assignee: Fujitsu Limited, Japan
       After "Limited," insert --Kawasaki,--.

[57] ABSTRACT
       Line 10, delete "an" (first occurrence) and insert --a--;
       Line 13, delete "wave" and insert --signal--.

Col. 3
Line 45, delete "amplifiers" and insert --amplified--;
Line 46, delete "amplifier" and insert --amplifiers--.

Col. 4
Line 66, delete "ratio" and insert --radio--.

Col. 5
*Line 16, delete "supervisory-controlled." and insert --supervisory-controller.--.
*Line 27, delete "own" and insert --the--.

Col. 6
*Line 2, delete "resulting" and insert --results--;
Line 47, delete "control" and insert --controls--;
Line 54, delete "signal" and insert --signals,--.

UNITED STATES PATENT AND TRADEMARK OFFICE
CERTIFICATE OF CORRECTION

PATENT NO. : 4,742,530

DATED : May 3, 1988

INVENTOR(S) : KAWAI

It is certified that error appears in the above-identified patent and that said Letters Patent is hereby corrected as shown below:

Col. 8
Line 42, delete "said" and insert --and--.

Col. 10
Line 49, delete "stations" and insert --station--.

Signed and Sealed this

Twentieth Day of September, 1988

Attest:

DONALD J. QUIGG

*Attesting Officer*  *Commissioner of Patents and Trademarks*